(12) United States Patent
Zhang et al.

(10) Patent No.: US 12,047,963 B2
(45) Date of Patent: Jul. 23, 2024

(54) DOWNLINK CONTROL INFORMATION FOR INDICATING A TRANSMISSION CONFIGURATION INDICATION STATE ASSOCIATED WITH A COMMON BEAM

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/454,149

(22) Filed: Nov. 9, 2021

(65) Prior Publication Data

US 2022/0150945 A1    May 12, 2022

Related U.S. Application Data

(60) Provisional application No. 63/198,753, filed on Nov. 10, 2020.

(51) Int. Cl.
*H04B 7/06* (2006.01)
*H04B 7/0408* (2017.01)
(Continued)

(52) U.S. Cl.
CPC .......... *H04W 72/23* (2023.01); *H04B 7/0408* (2013.01); *H04W 48/16* (2013.01); *H04W 72/20* (2023.01)

(58) Field of Classification Search
CPC ..... H04W 72/23; H04W 48/16; H04W 72/20; H04B 7/0408; H04B 7/008; H04L 5/0053
See application file for complete search history.

(56) References Cited

U.S. PATENT DOCUMENTS

2019/0254120 A1* 8/2019 Zhang ............... H04W 4/80
2020/0204236 A1 6/2020 Zhou et al.
(Continued)

FOREIGN PATENT DOCUMENTS

WO   WO-2021029138 A1 *   2/2021   .......... H04B 7/0626
WO   WO-2021029138 A1 *   4/2021   .......... H04B 7/0626
(Continued)

OTHER PUBLICATIONS

3GPP TSG RAN WG1#101, R1-2205732 Title: LS on rate matching pattern and CIRESET configuration for MBS (Year: 2022).*
(Continued)

*Primary Examiner* — Faruk Hamza
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a base station may transmit, and a user equipment (UE) may receive, downlink control information (DCI) that indicates a transmission configuration indication (TCI) state associated with a common beam for joint downlink and uplink communication, downlink communication only, or uplink communication only. The UE and the base station may communicate on one or more of a downlink or an uplink using the common beam associated with the TCI state indicated in the DCI. Numerous other aspects are provided.

28 Claims, 8 Drawing Sheets

(51) Int. Cl.
*H04L 5/00* (2006.01)
*H04W 48/16* (2009.01)
*H04W 72/20* (2023.01)
*H04W 72/23* (2023.01)

(56) References Cited

U.S. PATENT DOCUMENTS

| | | | |
|---|---|---|---|
| 2020/0305168 A1* | 9/2020 | Liou | H04W 76/11 |
| 2021/0105851 A1* | 4/2021 | Kim | H04W 76/27 |
| 2022/0030788 A1* | 2/2022 | Humbert | C12N 15/102 |
| 2022/0039012 A1* | 2/2022 | Kwon | H04W 68/005 |
| 2022/0278787 A1* | 9/2022 | Liu | H04L 5/0035 |
| 2022/0294578 A1* | 9/2022 | Kim | H04L 5/005 |
| 2022/0376880 A1* | 11/2022 | Zhang | H04L 5/0048 |
| 2022/0393829 A1* | 12/2022 | Kim | H04L 1/18 |
| 2022/0400489 A1* | 12/2022 | Kim | H04W 72/23 |
| 2023/0041109 A1* | 2/2023 | Ling | H04L 5/0023 |
| 2023/0080431 A1* | 3/2023 | Matsumura | H04W 16/28 370/329 |
| 2023/0179279 A1* | 6/2023 | Huang | H04B 7/088 370/252 |

FOREIGN PATENT DOCUMENTS

| | | | | |
|---|---|---|---|---|
| WO | WO-2021062973 A1 * | 4/2021 | | H04B 7/0695 |
| WO | WO-2021066536 A1 * | 4/2021 | | H04B 7/024 |

OTHER PUBLICATIONS

3GPP TSG-RAN4#91 Meeting, R4-1905360 Title: Further discussion on TSI state switching requirements (Year: 2019).*

3GPP TSG RAN WG1#106e, R1-2106657 Title: Joint channel estimation for PUSCH coverage enhancements (Year: 2021).*

3GPP TSG RAN WG1 Meeting#93, R1-1805808 Title: LS on removal of csi-RS-for tracking from TCI-State (Year: 2018).*

CATT: "Discussion on Enhancement on Multi-Beam Operation", 3GPP Draft, R1-2007824, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946505, 10 Pages, Retrieved from the Internet: URL:https://ftp.3gpp.org/tsg_ran/WG1_RL1/TSGR1_103-e/Docs/R1-2007824.zip R1-2007824.docx [retrieved on Oct. 24, 2020] p. 4-p. 6.

International Search Report and Written Opinion—PCT/US2021/072333—ISA/EPO—Mar. 2, 2022.

Moderator (Samsung): "Moderator Summary#2 for Multi-Beam Enhancement: Proposal Categorization", 3GPP Draft, 3GPP TSG RAN WG1 #102-e, R1-2007189, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 27, 2020 (Aug. 27, 2020), XP051922607, 27 Pages, Retrieved from the Internet: URL: https://ftp.3gpp.org/tsg_ran/WG1_RL1/TSGR1_102-e/Docs/R1-2007189.zip R1-2007189 R17FeMIMO summary2 Item 1 category.docx [retrieved on Aug. 27, 2020] p. 2, point 3, Dynamic TCI State Update Signaling Medium for Common TCI State Update Operation, pp. 18, 20, Table 8.

OPPO: "Analysis of Control Signaling for Multi-Beam Operation", 3GPP Draft, R1-2008755, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946698, 5 Pages, Retrieved from the Internet: URL:https://ftp.3gpp.org/tsg_ran/WG1_RL1/TSGR1_103-e/Docs/R1-2008755.zip R1-2008755.docx [retrieved on Oct. 24, 2020] p. 2-p. 3.

* cited by examiner

DOWNLINK CONTROL INFORMATION FOR INDICATING A TRANSMISSION CONFIGURATION INDICATION STATE ASSOCIATED WITH A COMMON BEAM

CROSS-REFERENCE TO RELATED APPLICATION

This Patent Application claims priority to U.S. Provisional Patent Application No. 63/198,753, filed on Nov. 10, 2020, entitled "DOWNLINK CONTROL INFORMATION FOR INDICATING A TRANSMISSION CONFIGURATION INDICATION STATE ASSOCIATED WITH A COMMON BEAM," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink control information (DCI) for indicating a transmission configuration indication (TCI) state associated with a common beam.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, downlink control information (DCI) that indicates a transmission configuration indication (TCI) state associated with a common beam for joint downlink and uplink communication, downlink communication only, or uplink communication only; and communicating with the base station on one or more of a downlink or an uplink using the common beam associated with the TCI state indicated in the DCI.

In some aspects, a method of wireless communication performed by a base station includes transmitting, to a UE, DCI that indicates a TCI state associated with a common beam for joint downlink and uplink communication, downlink communication only, or uplink communication only; and communicating with the UE on one or more of a downlink or an uplink using the common beam associated with the TCI state indicated in the DCI.

In some aspects, a UE for wireless communication includes a memory and one or more processors, coupled to the memory, configured to: receive, from a base station, DCI that indicates a TCI state associated with a common beam for joint downlink and uplink communication, downlink communication only, or uplink communication only; and communicate with the base station on one or more of a downlink or an uplink using the common beam associated with the TCI state indicated in the DCI.

In some aspects, a base station for wireless communication includes a memory and one or more processors, coupled to the memory, configured to: transmit, to a UE, DCI that indicates a TCI state associated with a common beam for joint downlink and uplink communication, downlink communication only, or uplink communication only; and communicate with the UE on one or more of a downlink or an uplink using the common beam associated with the TCI state indicated in the DCI.

In some aspects, a non-transitory computer-readable medium storing a set of instructions for wireless communication includes one or more instructions that, when executed by one or more processors of a UE, cause the UE to: receive, from a base station, DCI that indicates a TCI state associated with a common beam for joint downlink and uplink communication, downlink communication only, or uplink communication only; and communicate with the base station on one or more of a downlink or an uplink using the common beam associated with the TCI state indicated in the DCI.

In some aspects, a non-transitory computer-readable medium storing a set of instructions for wireless communication includes one or more instructions that, when executed by one or more processors of a base station, cause the base station to: transmit, to a UE, DCI that indicates a TCI state associated with a common beam for joint downlink and uplink communication, downlink communication only, or uplink communication only; and communicate with the UE on one or more of a downlink or an uplink using the common beam associated with the TCI state indicated in the DCI.

In some aspects, an apparatus for wireless communication includes means for receiving, from a base station, DCI that indicates a TCI state associated with a common beam for joint downlink and uplink communication, downlink communication only, or uplink communication only; and means for communicating with the base station on one or more of a downlink or an uplink using the common beam associated with the TCI state indicated in the DCI.

In some aspects, an apparatus for wireless communication includes means for transmitting, to a UE, DCI that indicates a TCI state associated with a common beam for joint downlink and uplink communication, downlink communication only, or uplink communication only; and means for communicating with the UE on one or more of a downlink or an uplink using the common beam associated with the TCI state indicated in the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
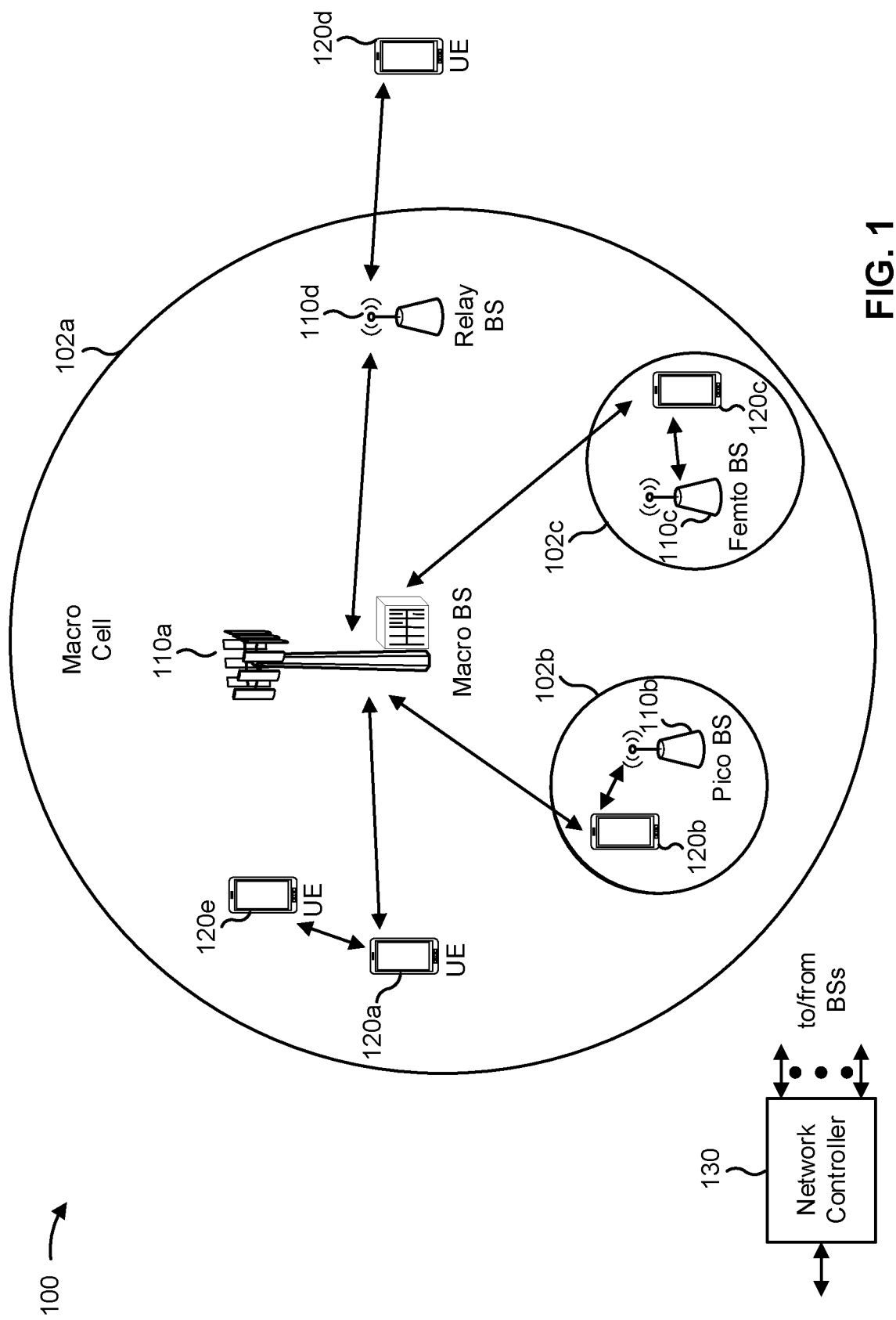
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
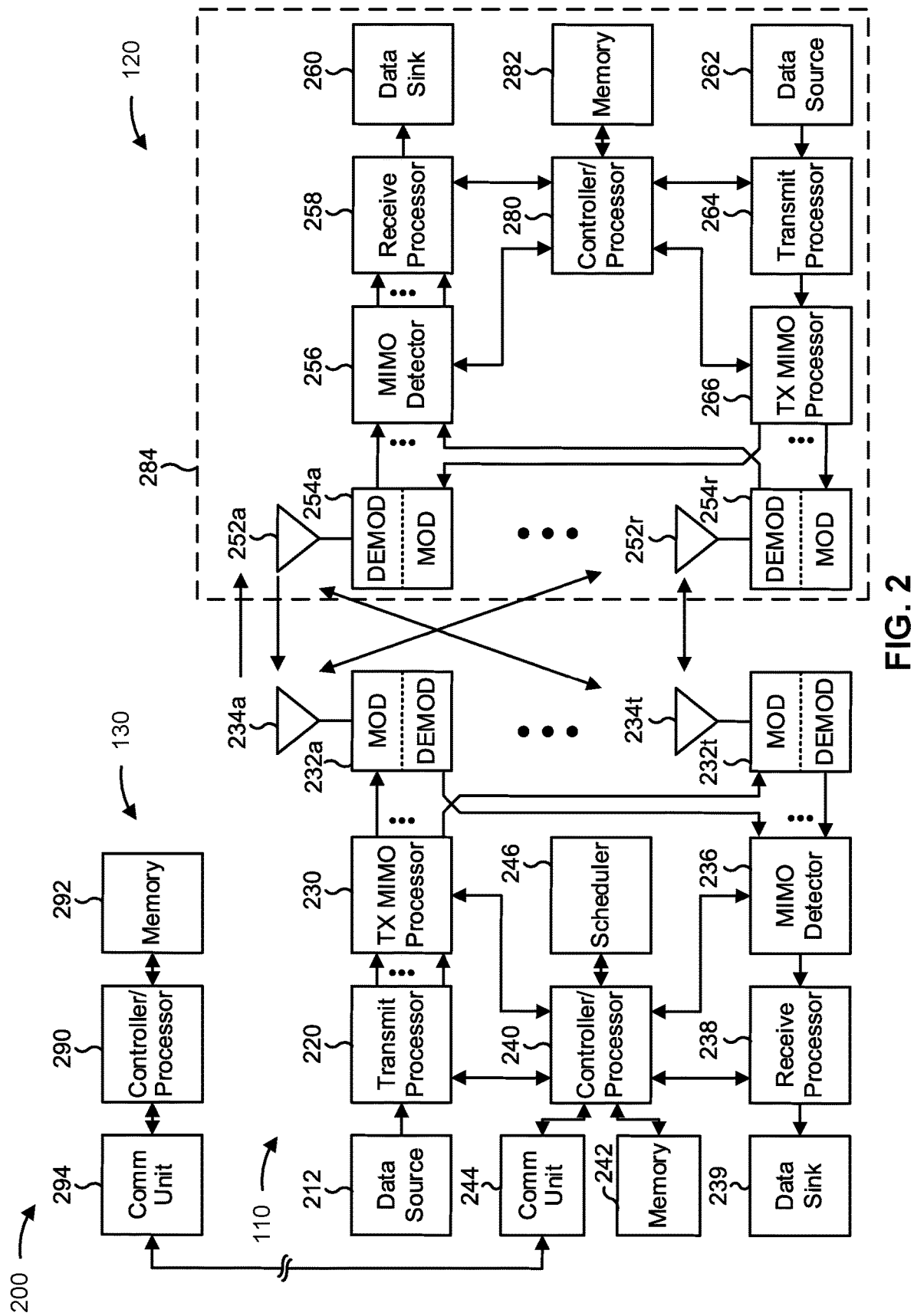
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with downlink control information (DCI) for indicating a joint downlink and uplink transmission configuration indication (TCI) state, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for receiving, from base station 110, DCI that indicates a TCI state associated with a common beam for joint downlink and uplink communication, downlink communication only, or uplink communication only and/or means for communicating with the base station 110 on one or more of a downlink or an uplink using the common beam associated with the TCI state indicated in the DCI. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to the UE 120, DCI that indicates a TCI state associated with a common beam for joint downlink and uplink communication, downlink communication only, or uplink communication only and/or means for communicating with the UE 120 on one or more of a downlink or an uplink using the common beam associated with the TCI state indicated in the DCI. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
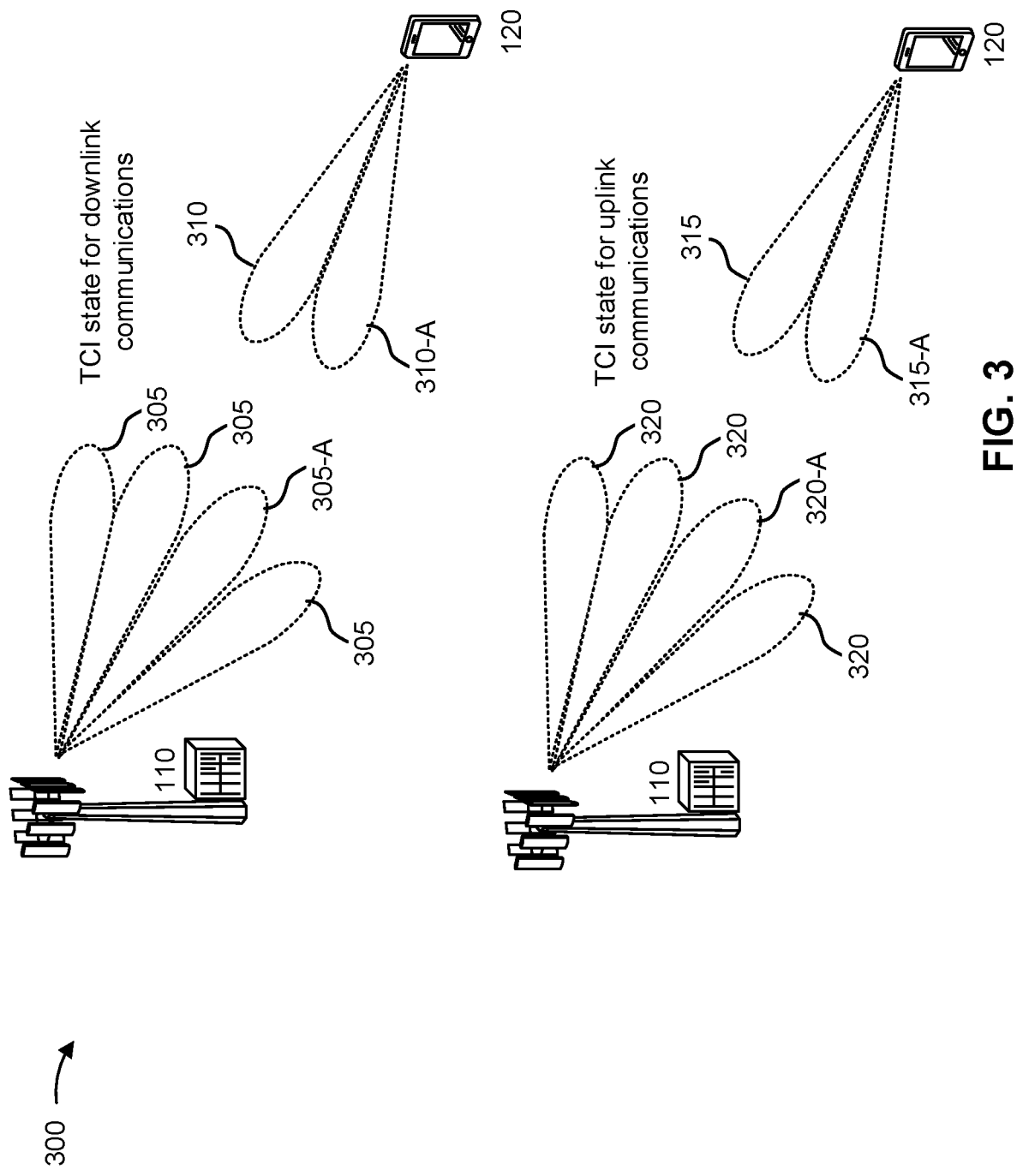
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another in a wireless network (e.g., wireless network 100).

The base station 110 may transmit to UEs 120 located within a coverage area of the base station 110. The base station 110 and the UE 120 may be configured for beamformed communications, where the base station 110 may transmit in the direction of the UE 120 using a directional base station transmit beam (e.g., a downlink transmit beam), and the UE 120 may receive the transmission using a directional UE receive beam (e.g., a downlink receive beam). Each downlink transmit beam may have an associated beam ID, beam direction, or beam symbols, among other examples. The base station 110 may transmit downlink communications to one or more UEs 120 via one or more downlink transmit beams 305.

The UE 120 may attempt to receive downlink transmissions via one or more downlink receive beams 310, which may be configured using different beamforming parameters at receive circuitry of the UE 120. The UE 120 may identify a particular downlink transmit beam 305, shown as downlink transmit beam 305-A, and a particular downlink receive beam 310, shown as downlink receive beam 310-A, that provide relatively favorable performance (e.g., that have a best channel quality of the different measured combinations of downlink transmit beams 305 and downlink receive beams 310). In some examples, the UE 120 may transmit an indication of which downlink transmit beam 305 is identified by the UE 120 as a preferred downlink transmit beam, which the base station 110 may select for transmissions to the UE 120. The UE 120 may thus attain and maintain a beam pair link (BPL) with the base station 110 for downlink communications (for example, a combination of the downlink transmit beam 305-A and the downlink receive beam 310-A), which may be further refined and maintained in accordance with one or more established beam refinement procedures.

A downlink beam, such as a downlink transmit beam 305 or a downlink receive beam 310, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each downlink transmit beam 305 may be associated with a synchronization signal block (SSB), and the UE 120 may indicate a preferred downlink transmit beam 305 by transmitting uplink transmissions in resources of the SSB that are associated with the preferred downlink transmit beam 305. A particular SSB may have an associated TCI state (e.g., for an antenna port or for beamforming). The base station 110 may, in some examples, indicate a downlink transmit beam 305 based at least in part on antenna port QCL properties that may be indicated by the TCI state. A TCI state may be associated with one downlink reference signal set (e.g., an SSB and an aperiodic, periodic, or semi-persistent channel state information reference signal (CSI-RS)) for different QCL types (e.g., QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a downlink receive beam 310 at the UE 120. Thus, the UE 120 may select a corresponding downlink receive beam 310 from a set of BPLs based at least in part on the base station 110 indicating a downlink transmit beam 305 via a TCI state indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and/or activated CORESET TCI states) for the UE 120 may be configured by a configuration message, such as a radio resource control (RRC) message.

Similarly, for uplink communications, the UE 120 may transmit in the direction of the base station 110 using a directional UE transmit beam (e.g., an uplink transmit beam), and the base station 110 may receive the transmission using a directional base station receive beam (e.g., an uplink receive beam). Each uplink transmit beam may have an associated beam ID, beam direction, or beam symbols, among other examples. The UE 120 may transmit uplink communications to the base station 110 via one or more uplink transmit beams 315.

The base station 110 may receive uplink transmissions from the UE 120 via one or more uplink receive beams 320. The base station 110 may identify a particular uplink transmit beam 315, shown as uplink transmit beam 315-A, and a particular uplink receive beam 320, shown as uplink receive beam 320-A, that provide relatively favorable performance (for example, that have a best channel quality of the different measured combinations of uplink transmit beams 315 and uplink receive beams 320). In some examples, the base station 110 may transmit an indication of which uplink transmit beam 315 is identified by the base station 110 as a preferred uplink transmit beam, which the base station 110 may select for transmissions from the UE 120. The UE 120 and the base station 110 may thus attain and maintain a BPL for uplink communications (for example, a combination of the uplink transmit beam 315-A and the uplink receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

Additionally, or alternatively, as shown in FIG. 3, an uplink TCI state may be defined for beamformed uplink communications. In such cases, each valid uplink TCI state configuration may contain a source reference signal to indicate an uplink transmit beam for a target uplink communication (e.g., a target uplink reference signal or a target uplink channel). For example, the source reference signal may be a sounding reference signal (SRS), an SSB, and/or a CSI-RS, among other examples, and the target uplink communication may be a physical random access channel (PRACH), a physical uplink control channel (PUCCH), a physical uplink shared channel (PUSCH), an SRS, and/or a DMRS (e.g., a DMRS for a PUCCH or a PUSCH), among other examples. In this way, supporting uplink TCI states may enable a unified TCI framework for downlink and uplink communications, and/or may enable the base station 110 to indicate various uplink QCL relationships for an uplink TCI state (e.g., Doppler shift, Doppler spread, average delay, and/or delay spread, among other examples). However, signaling techniques to inform a UE 120 about which TCI state is to be activated for a particular combination of downlink and/or uplink resources are not clearly defined, which may prevent the base station 110 and the UE 120 from implementing a unified TCI framework for downlink and uplink communications.

Furthermore, in multi-beam operation, a UE 120 and a base station 110 may perform downlink and/or uplink beam management to establish and/or refine the beam management parameters and/or reference signal parameters used for downlink and/or uplink communication. Accordingly, downlink and/or uplink beam management may enable greater intra-cell mobility (e.g., as a physical orientation of a UE 120 changes and/or clusters or blocking objects in the channel change, among other examples), may enable greater inter-cell mobility (e.g., when a UE 120 is handed over from one base station 110 to another base station 110), and/or may enable a greater number of configured TCI states. In some circumstances, however, the beam management parameters and/or reference signal parameters for a UE 120 may change frequently. For example, a UE 120 may encounter frequent blockages or may change position or orientation quickly. In these circumstances, significant latency and overhead may occur, thus consuming computing resources. For example, there may be latency and overhead involved in transmitting and measuring reference signals, communicating regarding beam configuration or identity, and/or the like.

When a beam changes, a base station 110 may switch an active beam configuration from one beam configuration to another beam configuration. For example, the beam configuration may include a downlink beam configuration, an uplink downlink beam configuration, a reference signal beam configuration, and/or the like. This may be referred to as activating the downlink beam configuration, the uplink beam configuration, or the reference signal beam configuration. If higher-layer signaling (e.g., RRC signaling, medium access control (MAC) signaling, such as a MAC control element (MAC-CE), and/or the like) is used to transmit downlink and/or uplink beam activation information and/or reference signal beam activation information, the UE 120 may experience significant latency while processing the higher-layer signaling and applying an activation command (e.g., a three millisecond activation latency to apply a beam switch or beam activation command that is signaled using a MAC-CE). Furthermore, existing techniques generally activate or otherwise indicate a downlink beam separately from an uplink beam, which introduces additional beam indication overhead and/or latency associated with communicating, processing, and/or applying separate downlink and uplink beam activation commands.

Some aspects described herein relate to techniques and apparatuses whereby a base station may signal, to a UE, a TCI state to be used for downlink and/or uplink communications between the UE and the base station. For example, in some aspects, the TCI state may indicate a common beam associated with one or more downlink and/or uplink signals (e.g., one or more downlink signals, one or more uplink signals, or a combination of one or more downlink signals and one or more uplink signals). In this way, signaling a common beam using a single TCI state indication may reduce beam indication overhead and/or latency relative to approaches in which different beams (e.g., downlink and uplink beams, or beams for different downlink signals and/or different uplink signals) are activated or otherwise indicated separately. Furthermore, the TCI state may be signaled using physical layer signaling, such as DCI, which further reduces latency and/or overhead relative to beam management techniques in which downlink and/or uplink beam activation commands are communicated using higher-layer signaling, such as an RRC message or a MAC-CE.

As indicated above, FIG. 3 is provided as an example. Other examples may differ from what is described with regard to FIG. 3.

Figure 4:
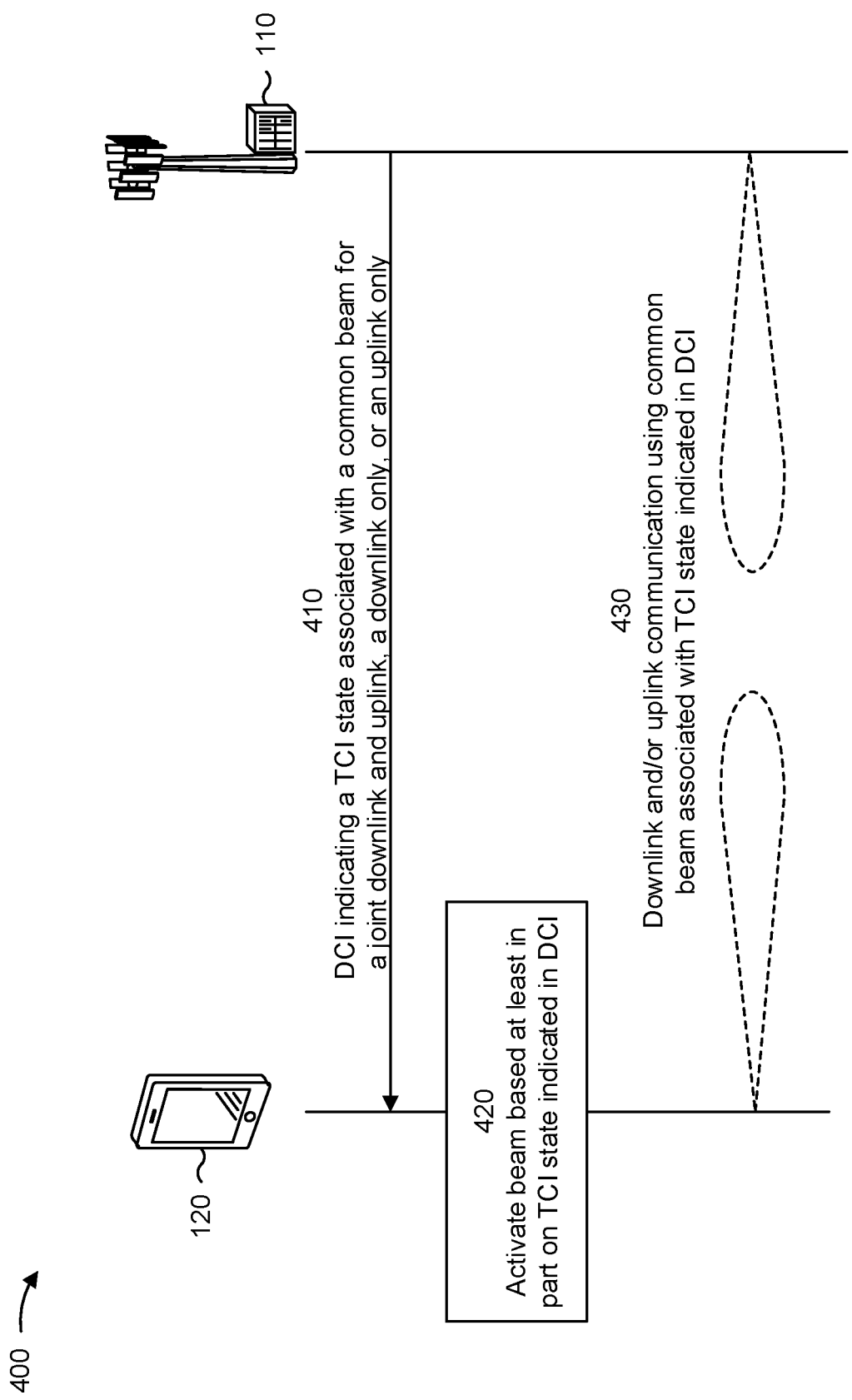
FIG. 4 is a diagram illustrating an example associated with downlink control information (DCI) for indicating a transmission configuration indication (TCI) state associated with a common beam, in accordance with the present disclosure.

FIG. 4 is a diagram illustrating an example 400 associated with DCI for indicating a TCI state associated with a common beam, in accordance with the present disclosure. As shown in FIG. 4, example 400 includes communication between a base station 110 and a UE 120. In some aspects, the base station 110 and the UE 120 may communicate in a wireless network, such as wireless network 100. The base station 110 and the UE 120 may communicate via a wireless access link, which may include a downlink and an uplink.

In some aspects, as described herein, the base station 110 and the UE 120 may communicate on the downlink and the uplink using beamformed communications. For example, on the downlink, the base station 110 may use a downlink transmit beam to transmit one or more downlink signals to the UE 120, and the UE 120 may use a corresponding downlink receive beam to receive the one or more downlink signals from the base station 110. Similarly, on the uplink, the UE 120 may use an uplink transmit beam to transmit one or more uplink signals to the base station 110, and the base station 110 may use a corresponding uplink receive beam to receive the one or more uplink signals from the UE 120. In some aspects, the downlink transmit beam and the corresponding downlink receive beam may be associated with a downlink TCI state, and the uplink transmit beam and the corresponding uplink receive beam may be associated with an uplink TCI state. Additionally, or alternatively, a joint downlink and uplink TCI state may be associated with a common beam to be used to communicate any suitable combination of downlink signals and/or uplink signals.

As shown in FIG. 4, and by reference number 410, the base station 110 may transmit, and the UE 120 may receive, DCI that indicates a TCI state associated with a common beam. As described herein, the common beam may be for joint downlink and uplink communication, for downlink communication only, or for uplink communication only. For example, in some aspects, the TCI state may identify a common beam that the UE 120 is to use to receive one or more downlink signals from the base station 110 and/or to transmit one or more uplink signals to the base station 110. For example, in some aspects, the TCI state indicated in the DCI may apply to multiple signals, which may include a first number of downlink signals and a second number of uplink signals. For example, the TCI state may apply to multiple downlink signals only (e.g., two or more downlink signals and zero uplink signals), to multiple uplink signals only (e.g., zero downlink signals and two or more uplink signals), or to a combination of downlink and uplink signals (e.g., one or more downlink signals and one or more uplink signals).

In some aspects, in cases where the TCI state applies to one or more downlink signals (e.g., the UE 120 is to use the common beam associated with the TCI state to receive one or more downlink signals from the base station 110), the downlink signal(s) associated with the TCI state may include, for example, a PDCCH, a PDSCH, a CSI-RS, and/or any suitable combination thereof. Additionally, or alternatively, in cases where the TCI state applies to one or more uplink signals (e.g., the UE 120 is to use the common beam associated with the TCI state to transmit one or more uplink signals to the base station 110), the uplink signal(s) associated with the TCI state may include, for example, a PUCCH, a PUSCH, a PRACH, an SRS, and/or any suitable combination thereof. In this way, the DCI may signal one TCI state to indicate a common beam to be used for different signals communicated using the common beam, which may include any suitable combination of downlink signals and/or uplink signals. For example, the TCI state may be associated with a particular SSB, a particular CSI-RS, and/or a particular SRS, among other examples, and a beam corresponding to the particular SSB, CSI-RS, SRS, and/or the like may be used to receive one or more downlink signals and/or to transmit one or more uplink signals.

In some aspects, the DCI that indicates the TCI state may be associated with a DCI format that is associated with indicating the TCI state. For example, one or more wireless communication standards may define various DCI formats for different purposes, such as DCI formats 0_0, 0_1, or 0_2 for PUSCH scheduling, DCI formats 1_0, 1_1, or 1_2 for PDSCH scheduling, DCI format 2_0 to indicate a slot format, DCI format 2_1 to indicate time and/or frequency resources in which no transmissions are intended for the UE 120, DCI format 2_2 to indicate transmit power control commands, and/or DCI format 2_3 to indicate transmit power control commands for one or more SRS transmissions, among other examples. Accordingly, in some aspects, the DCI that indicates the TCI state may be associated with a DCI format associated with indicating a TCI state to the UE 120 (e.g., as defined in a wireless communication standard). In some aspects, the DCI format may include information to schedule one or more downlink and/or uplink signals. In some aspects, information related to scheduling downlink and/or uplink signals may be excluded from the DCI format associated with indicating a TCI state to the UE 120.

Alternatively, in some aspects, the DCI that indicates the TCI state may be associated with an existing DCI format (e.g., a DCI format that is defined in one or more wireless communication standards). For example, in some aspects, the TCI state may be indicated in a DCI associated with DCI format 0_0, 0_1, or 0_2 for PUSCH scheduling, DCI format 1_0, 1_1, or 1_2 for PDSCH scheduling, DCI format 2_0 for indicating a slot format, and/or another suitable DCI format. In some aspects, the existing DCI format may include one or more reserved bits and/or one or more configurable fields, which may be used to indicate the TCI state and other related information (e.g., one or more downlink resource identifiers and/or uplink resource identifiers to which the UE 120 is to apply the joint downlink and uplink TCI state).

In some aspects, contents of the DCI that is used to indicate the TCI state may include an identifier associated with the TCI state and may further include a serving cell identifier and/or a bandwidth part identifier associated with the indicated TCI state. In this way, the UE 120 may determine a serving cell (e.g., a component carrier) and/or a bandwidth part in which the common beam corresponding to the identifier associated with the TCI state is to be used for downlink and/or uplink communication.

Furthermore, the contents of the DCI that indicates the TCI state may include resource identifiers associated with the downlink and/or uplink signals to which the TCI state applies. For example, in some aspects, the TCI state may be applicable to downlink and uplink control channels (e.g., a joint PDCCH/PUCCH TCI state), in which case the DCI contents may include a CORESET identifier for a downlink control channel and a PUCCH resource identifier for an uplink control channel. In another example, the TCI state may be applicable to downlink and uplink data channels (e.g., a joint PDSCH/PUSCH TCI state), in which case the DCI contents may include a PDSCH resource identifier for a downlink data channel and a PUSCH resource identifier for an uplink data channel. In another example, the TCI state may be applicable to downlink and uplink reference signals (e.g., a joint CSI-RS/SRS TCI state), in which case the DCI contents may include a per CSI-RS resource identifier with an associated CSI-RS resource set identifier and a per SRS resource identifier with an associated SRS resource set identifier. In another example, the TCI state may be applicable to downlink and uplink control and data channels (e.g., a joint PDCCH/PDSCH/PUCCH/PUSCH TCI state), in which case the DCI contents may include a CORESET identifier, a PDSCH resource identifier, a PUCCH resource identifier, and/or a PUSCH resource identifier.

Accordingly, as described above, the TCI state indicated in the DCI may generally apply to any suitable combination of downlink signals (e.g., a PDCCH, PDSCH, and/or CSI-RS) and/or uplink signals (e.g., a PUCCH, PUSCH, PRACH, and/or SRS), and the contents of the DCI may include resource identifiers for the combination of downlink signals and/or uplink signals to which the TCI state applies. For example, the DCI may include a PDCCH resource identifier and a PDSCH resource identifier where the TCI state is associated with downlink signals only, and/or a PUCCH resource identifier and a PUSCH resource identifier where the TCI state is associated with uplink signals only, among other examples.

In some aspects, the TCI state may be associated with a QCL source reference signal per QCL type. For example, as described above, a QCL type may be used to indicate a combination of QCL properties associated with a QCL source reference signal, such as a Doppler shift, a Doppler spread, an average delay, a delay spread, and/or one or more spatial receive parameters, among other examples. Accordingly, a QCL source reference signal may be defined per QCL type, whereby the QCL source reference signal associated with the TCI state may be based at least in part on the QCL type associated with the TCI state. For example, in some aspects, the QCL source reference signal associated with the TCI state may be a downlink reference signal, such as an SSB and/or a CSI-RS, or an uplink reference signal, such as an SRS.

As further shown in FIG. 4, and by reference number 420, the UE 120 may activate the common beam to be used to communicate with the base station 110 on a downlink and/or an uplink based at least in part on the TCI state indicated in the DCI. For example, the UE 120 may determine one or more downlink and/or uplink signals to be communicated using the common beam associated with the TCI state (e.g., based at least in part on one or more downlink and/or uplink resource identifiers included in the DCI). The UE 120 may configure one or more antenna elements to receive one or more downlink signals and/or to transmit one or more uplink signals in a direction associated with the common beam corresponding to the TCI state. Accordingly, the UE 120 may activate the common beam indicated by the TCI state for use in a particular serving cell and/or bandwidth part (e.g., based on a serving cell identifier and/or a bandwidth part identifier included in the DCI). Furthermore, in some aspects, the UE 120 may determine a QCL source reference signal associated with the TCI state (e.g., an SSB, a CSI-RS, or an SRS) based at least in part on a QCL type associated with the TCI state. In this way, the UE 120 may use one or more QCL properties associated with the QCL source reference signal to activate or otherwise configure the common beam associated with the TCI state indicated in the DCI.

As further shown in FIG. 4, and by reference number 430, the UE 120 and the base station 110 may communicate one or more signals on the downlink and/or the uplink using the common beam associated with the TCI state indicated in the DCI. For example, in cases where the TCI state is applicable to one or more downlink signals, the TCI state may indicate a downlink receive beam that the UE 120 is to use to receive a PDCCH, a PDSCH, and/or a CSI-RS that the base station 110 transmits using a corresponding downlink transmit beam. Additionally, or alternatively, in cases where the TCI state is applicable to one or more downlink signals, the TCI state may indicate an uplink transmit beam that the UE 120 is to use to transmit a PUCCH, a PUSCH, a PRACH, and/or an SRS that the base station 110 receives using a corresponding uplink receive beam. Accordingly, as described herein, the DCI may be used to indicate various parameters that relate to a TCI state, which may indicate a common beam to be used to communicate any suitable combination of downlink signals and/or uplink signals between the UE 120 and the base station 110.

As indicated above, FIG. 4 is provided as an example. Other examples may differ from what is described with regard to FIG. 4.

Figure 5:
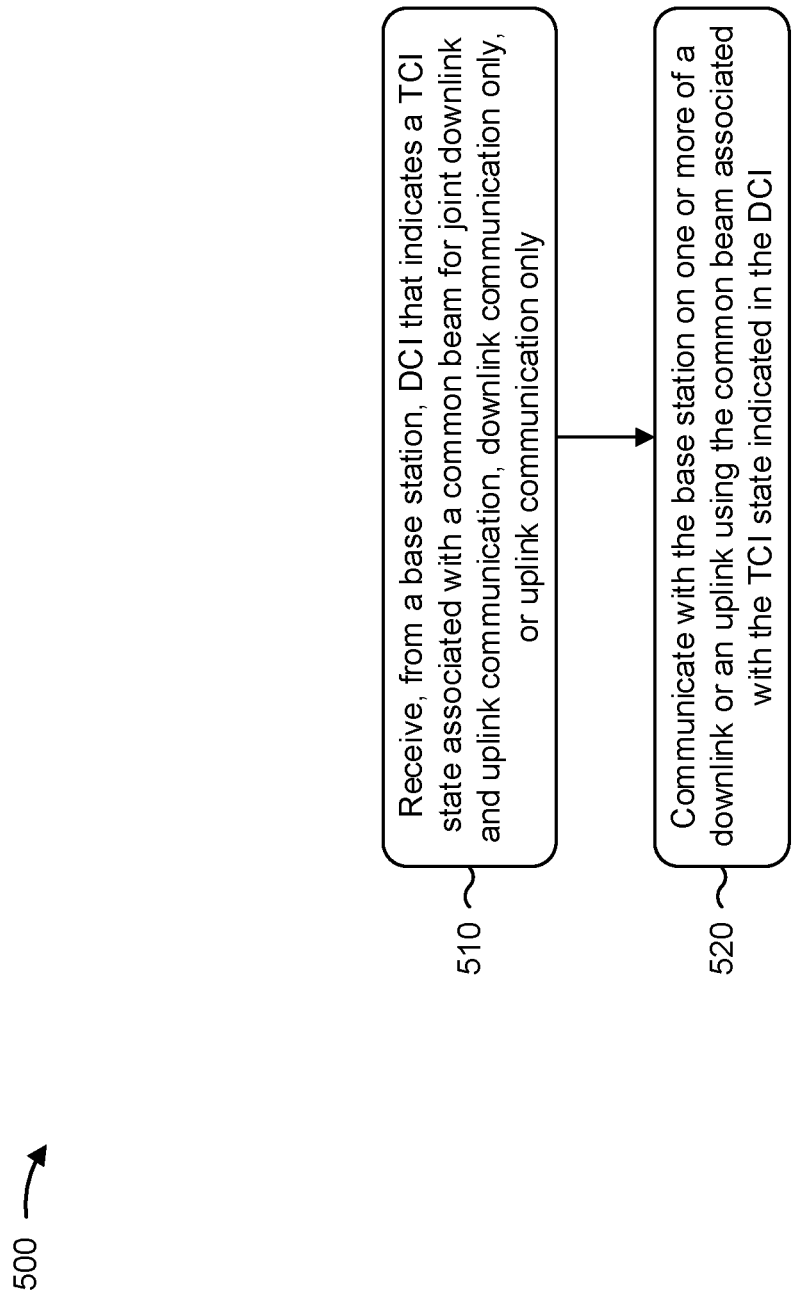
FIGS. 5-6 are diagrams illustrating example processes associated with DCI for indicating a TCI state associated with a common, in accordance with the present disclosure.

FIG. 5 is a diagram illustrating an example process 500 performed, for example, by a UE, in accordance with the present disclosure. Example process 500 is an example where the UE (e.g., UE 120) performs operations associated with DCI for indicating a TCI state associated with a common beam.

As shown in FIG. 5, in some aspects, process 500 may include receiving, from a base station, DCI that indicates a TCI state associated with a common beam for joint downlink and uplink communication, downlink communication only, or uplink communication only (block 510). For example, the UE (e.g., using reception component 702, depicted in FIG. 7) may receive, from a base station, DCI that indicates a TCI state associated with a common beam for joint downlink and uplink communication, downlink communication only, or uplink communication only, as described above.

As further shown in FIG. 5, in some aspects, process 500 may include communicating with the base station on one or more of a downlink or an uplink using the common beam associated with the TCI state indicated in the DCI (block 520). For example, the UE (e.g., using reception component 702, transmission component 704, and/or communication component 708, depicted in FIG. 7) may communicate with the base station on one or more of a downlink or an uplink using the common beam associated with the TCI state indicated in the DCI, as described above.

Process 500 may include additional aspects, such as any single aspect or any combination of aspects described below and/or in connection with one or more other processes described elsewhere herein.

In a first aspect, the TCI state applies to multiple signals that are communicated using the common beam.

In a second aspect, alone or in combination with the first aspect, the multiple signals include multiple downlink signals only, multiple uplink signals only, or at least one downlink signal and at least one uplink signal.

In a third aspect, alone or in combination with one or more of the first and second aspects, one or more of the multiple signals are for the downlink and include one or more of a PDCCH, a PDSCH, or a CSI-RS.

In a fourth aspect, alone or in combination with one or more of the first through third aspects, one or more of the multiple signals are for the uplink and include one or more of a PUCCH, a PUSCH, a PRACH, or an SRS.

In a fifth aspect, alone or in combination with one or more of the first through fourth aspects, the DCI is associated with a DCI format that is associated with indicating the TCI state and includes scheduling information for one or more downlink or uplink signals.

In a sixth aspect, alone or in combination with one or more of the first through fifth aspects, the DCI is associated with a DCI format that is associated with indicating the TCI state and does not include scheduling information for one or more downlink or uplink signals.

In a seventh aspect, alone or in combination with one or more of the first through sixth aspects, the TCI state is indicated in one or more reserved bits or one or more fields of the DCI.

In an eighth aspect, alone or in combination with one or more of the first through seventh aspects, the DCI includes an identifier associated with the TCI state and one or more of a serving cell identifier or a bandwidth part identifier associated with the TCI state.

In a ninth aspect, alone or in combination with one or more of the first through eighth aspects, the DCI includes resource identifiers associated with one or more downlink signals or one or more uplink signals that are communicated using the common beam associated with the TCI state.

In a tenth aspect, alone or in combination with one or more of the first through ninth aspects, the resource identifiers include a CORESET identifier and a PUCCH resource identifier based at least in part on the TCI state being applicable to communications associated with downlink and uplink control channels.

In an eleventh aspect, alone or in combination with one or more of the first through tenth aspects, the resource identifiers include a PDSCH resource identifier and a PUSCH resource identifier based at least in part on the TCI state being applicable to communications associated with downlink and uplink data channels.

In a twelfth aspect, alone or in combination with one or more of the first through eleventh aspects, the resource identifiers include a CSI-RS resource identifier and an SRS resource identifier based at least in part on the TCI state being applicable to communications associated with downlink and uplink reference signals.

In a thirteenth aspect, alone or in combination with one or more of the first through twelfth aspects, the resource identifiers include a CORESET identifier, a PUCCH resource identifier, a PDSCH resource identifier, and a PUSCH resource identifier based at least in part on the TCI state being applicable to communications associated with downlink and uplink control and data channels.

In a fourteenth aspect, alone or in combination with one or more of the first through thirteenth aspects, the resource identifiers include a CORESET identifier and a PDSCH resource identifier based at least in part on the TCI state being applicable to communications associated with downlink control and data channels.

In a fifteenth aspect, alone or in combination with one or more of the first through fourteenth aspects, the resource identifiers include a PUCCH resource identifier and a PUSCH resource identifier based at least in part on the TCI state being applicable to communications associated with uplink control and data channels.

In a sixteenth aspect, alone or in combination with one or more of the first through fifteenth aspects, the TCI state indicated in the DCI is associated with a QCL source reference signal per QCL type.

In a seventeenth aspect, alone or in combination with one or more of the first through sixteenth aspects, the QCL source reference signal includes an SSB, a CSI-RS, or an SRS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
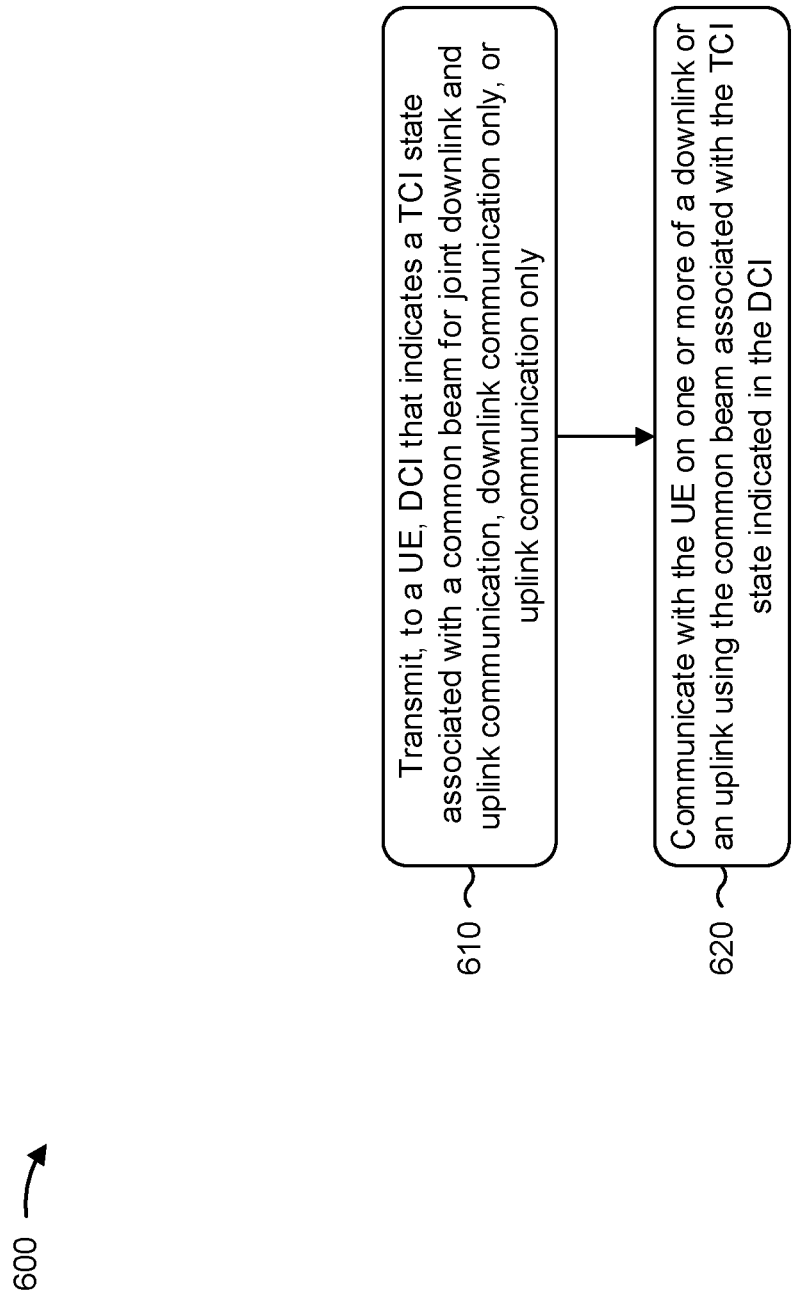

FIG. 6 is a diagram illustrating an example process 600 performed, for example, by a base station, in accordance with the present disclosure. Example process 600 is an example where the base station (e.g., base station 110) performs operations associated with DCI for indicating a TCI state.

As shown in FIG. 6, in some aspects, process 600 may include transmitting, to a UE, DCI that indicates a TCI state associated with a common beam for joint downlink and uplink communication, downlink communication only, or uplink communication only (block 610). For example, the base station (e.g., using transmission component 804, depicted in FIG. 8) may transmit, to a UE, DCI that indicates a TCI state associated with a common beam for joint downlink and uplink communication, downlink communication only, or uplink communication only, as described above.

As further shown in FIG. 6, in some aspects, process 600 may include communicating with the UE on one or more of a downlink or an uplink using the common beam associated with the TCI state indicated in the DCI (block 620). For example, the base station (e.g., using reception component 802, transmission component 804, and/or communication component 808, depicted in FIG. 8) may communicate with the UE on one or more of a downlink or an uplink using the common beam associated with the TCI state indicated in the DCI, as described above.

Process 600 may include additional aspects, such as any single aspect or any combination of aspects described below and/or in connection with one or more other processes described elsewhere herein.

In a first aspect, the TCI state applies to multiple signals that are communicated using the common beam.

In a second aspect, alone or in combination with the first aspect, the multiple signals include multiple downlink signals only, multiple uplink signals only, or at least one downlink signal and at least one uplink signal.

In a third aspect, alone or in combination with one or more of the first and second aspects, one or more of the multiple signals are for the downlink and include one or more of a PDCCH, a PDSCH, or a CSI-RS.

In a fourth aspect, alone or in combination with one or more of the first through third aspects, one or more of the multiple signals are for the uplink and include one or more of a PUCCH, a PUSCH, a PRACH, or an SRS.

In a fifth aspect, alone or in combination with one or more of the first through fourth aspects, the DCI is associated with a DCI format that is associated with indicating the TCI state and includes scheduling information for one or more downlink or uplink signals.

In a sixth aspect, alone or in combination with one or more of the first through fifth aspects, the DCI is associated with a DCI format that is associated with indicating the TCI state and does not include scheduling information for one or more downlink or uplink signals.

In a seventh aspect, alone or in combination with one or more of the first through sixth aspects, the TCI state is indicated in one or more reserved bits or one or more fields of the DCI.

In an eighth aspect, alone or in combination with one or more of the first through seventh aspects, the DCI includes an identifier associated with the TCI state and one or more of a serving cell identifier or a bandwidth part identifier associated with the TCI state.

In a ninth aspect, alone or in combination with one or more of the first through eighth aspects, the DCI includes resource identifiers associated with one or more downlink signals or one or more uplink signals that are communicated using the common beam associated with the TCI state.

In a tenth aspect, alone or in combination with one or more of the first through ninth aspects, the resource identifiers include a CORESET identifier and a PUCCH resource identifier based at least in part on the TCI state being applicable to communications associated with downlink and uplink control channels.

In an eleventh aspect, alone or in combination with one or more of the first through tenth aspects, the resource identifiers include a PDSCH resource identifier and a PUSCH resource identifier based at least in part on the TCI state being applicable to communications associated with downlink and uplink data channels.

In a twelfth aspect, alone or in combination with one or more of the first through eleventh aspects, the resource identifiers include a CSI-RS resource identifier and an SRS resource identifier based at least in part on the TCI state being applicable to communications associated with downlink and uplink reference signals.

In a thirteenth aspect, alone or in combination with one or more of the first through twelfth aspects, the resource identifiers include a CORESET identifier, a PUCCH resource identifier, a PDSCH resource identifier, and a PUSCH resource identifier based at least in part on the TCI state being applicable to communications associated with downlink and uplink control and data channels.

In a fourteenth aspect, alone or in combination with one or more of the first through thirteenth aspects, the resource identifiers include a CORESET identifier and a PDSCH resource identifier based at least in part on the TCI state being applicable to communications associated with downlink control and data channels.

In a fifteenth aspect, alone or in combination with one or more of the first through fourteenth aspects, the resource identifiers include a PUCCH resource identifier and a PUSCH resource identifier based at least in part on the TCI state being applicable to communications associated with uplink control and data channels.

In a sixteenth aspect, alone or in combination with one or more of the first through fifteenth aspects, the TCI state indicated in the DCI is associated with a QCL source reference signal per QCL type.

In a seventeenth aspect, alone or in combination with one or more of the first through sixteenth aspects, the QCL source reference signal includes an SSB, a CSI-RS, or an SRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
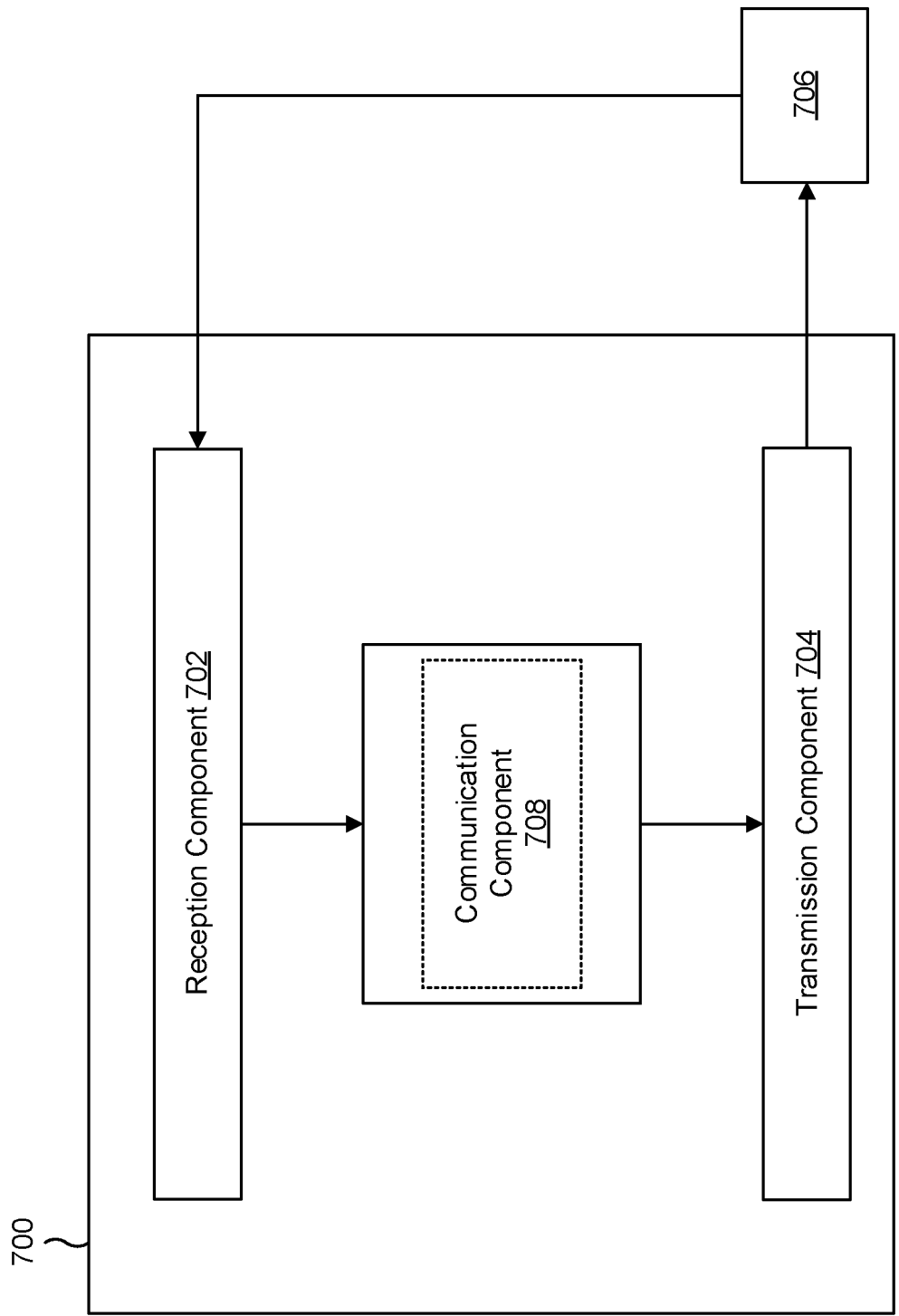
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a base station, DCI that indicates a TCI state associated with a common beam for joint downlink and uplink communication, downlink communication only, or uplink communication only. The communication component 708 may communicate, or may cause the reception component 702 and/or the transmission component 704 to communicate, with the base station on one or more of a downlink or an uplink using the common beam associated with the TCI state indicated in the DCI.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
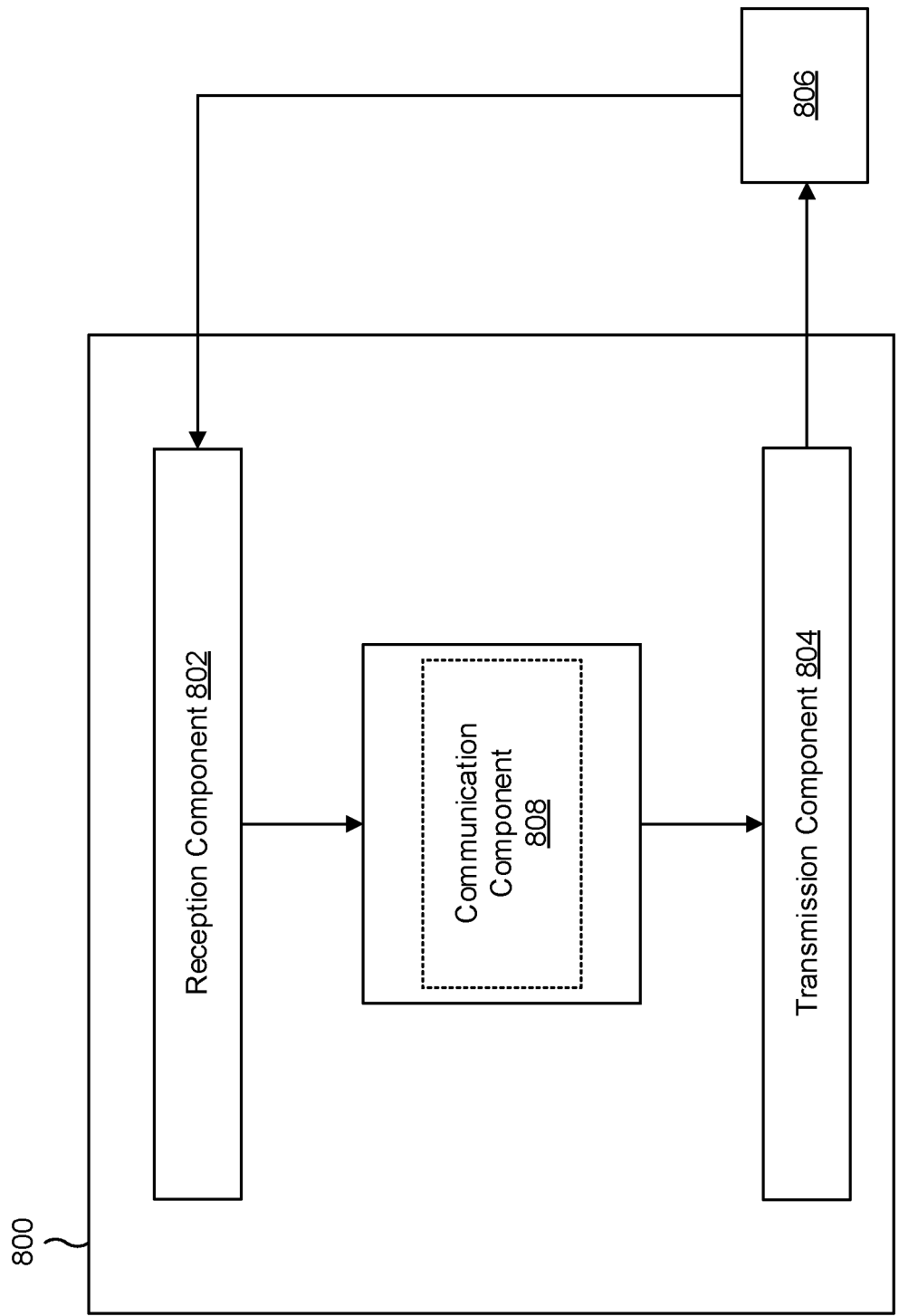

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, DCI that indicates a TCI state associated with a common beam for joint downlink and uplink communication, downlink communication only, or uplink communication only. The communication component 808 may communicate, or may cause the reception component 802 and/or the transmission component 804 to communicate, with the UE on one or more of a downlink or an uplink using the common beam associated with the TCI state indicated in the DCI.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving, from a base station, DCI that indicates a TCI state associated with a common beam for joint downlink and uplink communication, downlink communication only, or uplink communication only; and communicating with the base station on one or more of a downlink or an uplink using the common beam associated with the TCI state indicated in the DCI.

Aspect 2: The method of Aspect 1, wherein the TCI state applies to multiple signals that are communicated using the common beam.

Aspect 3: The method of Aspect 2, wherein the multiple signals include multiple downlink signals only, multiple uplink signals only, or at least one downlink signal and at least one uplink signal.

Aspect 4: The method of any of Aspects 2-3, wherein one or more of the multiple signals are for the downlink and include one or more of a PDCCH, a PDSCH, or a CSI-RS.

Aspect 5: The method of any of Aspects 2-4, wherein one or more of the multiple signals are for the uplink and include one or more of a PUCCH, a PUSCH, a PRACH, or an SRS.

Aspect 6: The method of any of Aspects 1-5, wherein the DCI is associated with a DCI format that is associated with indicating the TCI state and includes scheduling information for one or more downlink or uplink signals.

Aspect 7: The method of any of Aspects 1-5, wherein the DCI is associated with a DCI format that is associated with indicating the TCI state and does not include scheduling information for one or more downlink or uplink signals.

Aspect 8: The method of any of Aspects 1-7, wherein the TCI state is indicated in one or more reserved bits or one or more fields of the DCI.

Aspect 9: The method of any of Aspects 1-8, wherein the DCI includes an identifier associated with the TCI state and one or more of a serving cell identifier or a bandwidth part identifier associated with the TCI state.

Aspect 10: The method of any of Aspects 1-9, wherein the DCI includes resource identifiers associated with one or more downlink signals or one or more uplink signals that are communicated using the common beam associated with the TCI state.

Aspect 11: The method of Aspect 10, wherein the resource identifiers include a CORESET identifier and a PUCCH resource identifier based at least in part on the TCI state being applicable to communications associated with downlink and uplink control channels.

Aspect 12: The method of any of Aspects 10-11, wherein the resource identifiers include a PDSCH resource identifier and a PUSCH resource identifier based at least in part on the TCI state being applicable to communications associated with downlink and uplink data channels.

Aspect 13: The method of any of Aspects 10-12, wherein the resource identifiers include a CSI-RS resource identifier and a SRS resource identifier based at least in part on the TCI state being applicable to communications associated with downlink and uplink reference signals.

Aspect 14: The method of any of Aspects 10-13, wherein the resource identifiers include a CORESET identifier, a PUCCH resource identifier, a PDSCH resource identifier, and a PUSCH resource identifier based at least in part on the TCI state being applicable to communications associated with downlink and uplink control and data channels.

Aspect 15: The method of any of Aspects 10-14, wherein the resource identifiers include a CORESET identifier and a PDSCH resource identifier based at least in part on the TCI state being applicable to communications associated with downlink control and data channels.

Aspect 16: The method of any of Aspects 10-15, wherein the resource identifiers include a PUCCH resource identifier and a PUSCH resource identifier based at least in part on the TCI state being applicable to communications associated with uplink control and data channels.

Aspect 17: The method of any of Aspects 1-16, wherein the TCI state indicated in the DCI is associated with a QCL source reference signal per QCL type.

Aspect 18: The method of Aspect 17, wherein the QCL source reference signal includes an SSB, a CSI-RS, or an SRS.

Aspect 19: A method of wireless communication performed by a base station, comprising: transmitting, to a UE, DCI that indicates a TCI state associated with a common beam for joint downlink and uplink communication, downlink communication only, or uplink communication only; and communicating with the UE on one or more of a downlink or an uplink using the common beam associated with the TCI state indicated in the DCI.

Aspect 20: The method of Aspect 19, wherein the TCI state applies to multiple signals that are communicated using the common beam.

Aspect 21: The method of Aspect 20, wherein the multiple signals include multiple downlink signals only, multiple uplink signals only, or at least one downlink signal and at least one uplink signal.

Aspect 22: The method of any of Aspects 20-21, wherein one or more of the multiple signals are for the downlink and include one or more of a PDCCH, a PDSCH, or a CSI-RS.

Aspect 23: The method of any of Aspects 20-22, wherein one or more of the multiple signals are for the uplink and include one or more of a PUCCH, a PUSCH, a PRACH, or an SRS.

Aspect 24: The method of any of Aspects 19-23, wherein the DCI is associated with a DCI format that is associated with indicating the TCI state and includes scheduling information for one or more downlink or uplink signals.

Aspect 25: The method of any of Aspects 19-23, wherein the DCI is associated with a DCI format that is associated with indicating the TCI state and does not include scheduling information for one or more downlink or uplink signals.

Aspect 26: The method of any of Aspects 19-25, wherein the TCI state is indicated in one or more reserved bits or one or more fields of the DCI.

Aspect 27: The method of any of Aspects 19-26, wherein the DCI includes an identifier associated with the TCI state and one or more of a serving cell identifier or a bandwidth part identifier associated with the TCI state.

Aspect 28: The method of any of Aspects 19-27, wherein the DCI includes resource identifiers associated with one or more downlink signals or one or more uplink signals that are communicated using the common beam associated with the TCI state.

Aspect 29: The method of Aspect 28, wherein the resource identifiers include a CORESET identifier and a PUCCH resource identifier based at least in part on the TCI state being applicable to communications associated with downlink and uplink control channels.

Aspect 30: The method of any of Aspects 28-29, wherein the resource identifiers include a PDSCH resource identifier and a PUSCH resource identifier based at least in part on the TCI state being applicable to communications associated with downlink and uplink data channels.

Aspect 31: The method of any of Aspects 28-30, wherein the resource identifiers include a CSI-RS resource identifier and an SRS resource identifier based at least in part on the TCI state being applicable to communications associated with downlink and uplink reference signals.

Aspect 32: The method of any of Aspects 28-31, wherein the resource identifiers include a CORESET identifier, a PUCCH resource identifier, a PDSCH resource identifier, and a PUSCH resource identifier based at least in part on the TCI state being applicable to communications associated with downlink and uplink control and data channels.

Aspect 33: The method of any of Aspects 28-32, wherein the resource identifiers include a CORESET identifier and a PDSCH resource identifier based at least in part on the TCI state being applicable to communications associated with downlink control and data channels.

Aspect 34: The method of any of Aspects 28-33, wherein the resource identifiers include a PUCCH resource identifier and a PUSCH resource identifier based at least in part on the TCI state being applicable to communications associated with uplink control and data channels.

Aspect 35: The method of any of Aspects 19-34, wherein the TCI state indicated in the DCI is associated with a QCL source reference signal per QCL type.

Aspect 36: The method of Aspect 35, wherein the QCL source reference signal includes an SSB, a CSI-RS, or an SRS.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a base station, downlink control information (DCI) that indicates a transmission configuration indication (TCI) state associated with a common beam for joint downlink and uplink communication,
wherein the DCI includes resource identifiers associated with one or more downlink signals or one or more uplink signals that are communicated using the common beam associated with the TCI state, wherein the resource identifiers include:
a control resource set (CORESET) identifier and a physical uplink control channel (PUCCH) resource identifier based at least in part on the TCI state being applicable to communications associated with downlink and uplink control channels,
a physical downlink shared channel (PDSCH) resource identifier and a physical uplink shared channel (PUSCH) resource identifier based at least in part on the TCI state being applicable to communications associated with downlink and uplink data channels,
a channel state information reference signal (CSI-RS) resource identifier and a sounding reference signal (SRS) resource identifier based at least in part on the TCI state being applicable to communications associated with downlink and uplink reference signals,
a CORESET identifier, a PUCCH resource identifier, a PDSCH resource identifier, and a PUSCH resource identifier based at least in part on the TCI state being applicable to communications associated with downlink and uplink control and data channels,
a CORESET identifier and a PDSCH resource identifier based at least in part on the TCI state being applicable to communications associated with downlink control and data channels, or
a PUCCH resource identifier and a PUSCH resource identifier based at least in part on the TCI state being applicable to communications associated with uplink control and data channels; and
communicating with the base station on one or more of a downlink or an uplink using the common beam associated with the TCI state indicated in the DCI.

2. The method of claim 1, wherein the TCI state applies to multiple signals that are communicated using the common beam.

3. The method of claim 2, wherein the multiple signals include at least one downlink signal and at least one uplink signal.

4. The method of claim 2, wherein the one or more downlink signals include one or more of a physical downlink control channel, a physical downlink shared channel, or a channel state information reference signal.

5. The method of claim 2, wherein the one or more uplink signals include one or more of a physical uplink control channel, a physical uplink shared channel, a physical random access channel, or a sounding reference signal.

6. The method of claim 1, wherein the DCI is associated with a DCI format that is associated with indicating the TCI state and includes scheduling information for the one or more downlink signals or the one or more uplink signals.

7. The method of claim 1, wherein the DCI is associated with a DCI format that is associated with indicating the TCI state and does not include scheduling information for the one or more downlink signals or the one or more uplink signals.

8. The method of claim 1, wherein the TCI state is indicated in one or more reserved bits or one or more fields of the DCI.

9. The method of claim 1, wherein the DCI includes an identifier associated with the TCI state and one or more of a serving cell identifier or a bandwidth part identifier associated with the TCI state.

10. The method of claim 1, wherein the TCI state indicated in the DCI is associated with a quasi co-location (QCL) source reference signal per QCL type.

11. The method of claim 10, wherein the QCL source reference signal includes a synchronization signal block, a channel state information reference signal, or a sounding reference signal.

12. A method of wireless communication performed by a base station, comprising:
transmitting, to a user equipment (UE), downlink control information (DCI) that indicates a transmission configuration indication (TCI) state associated with a common beam for joint downlink and uplink communication,
wherein the DCI includes resource identifiers associated with one or more downlink signals or one or more uplink signals that are communicated using the common beam associated with the TCI state, wherein the resource identifiers include:
a control resource set identifier (CORESET) and a physical uplink control channel (PUCCH) resource identifier based at least in part on the TCI state being applicable to communications associated with downlink and uplink control channels,
a physical downlink shared channel (PDSCH) resource identifier and a physical uplink shared channel (PUSCH) resource identifier based at least in part on the TCI state being applicable to communications associated with downlink and uplink data channels,
a channel state information reference signal (CSI-RS) resource identifier and a sounding reference signal (SRS) resource identifier based at least in part on the TCI state being applicable to communications associated with downlink and uplink reference signals,
a CORESET identifier, a PUCCH resource identifier, a PDSCH resource identifier, and a PUSCH resource identifier based at least in part on the TCI state being applicable to communications associated with downlink and uplink control and data channels,
a CORESET identifier and a PDSCH resource identifier based at least in part on the TCI state being applicable to communications associated with downlink control and data channels, or
a PUCCH resource identifier and a PUSCH resource identifier based at least in part on the TCI state being applicable to communications associated with uplink control and data channels; and communicating with the UE on one or more of a downlink or an uplink using the common beam associated with the TCI state indicated in the DCI.

13. The method of claim 12, wherein the TCI state applies to multiple signals that are communicated using the common beam.

14. The method of claim 13, wherein the multiple signals include at least one downlink signal and at least one uplink signal.

15. The method of claim 13, wherein the one or more downlink signals include one or more of a physical downlink control channel, a physical downlink shared channel, or a channel state information reference signal.

16. The method of claim 13, wherein the one or more uplink signals include one or more of a physical uplink control channel, a physical uplink shared channel, a physical random access channel, or a sounding reference signal.

17. The method of claim 12, wherein the DCI is associated with a DCI format that is associated with indicating the TCI state and includes scheduling information for the one or more downlink signals or the one or more uplink signals.

18. The method of claim 12, wherein the DCI is associated with a DCI format that is associated with indicating the TCI state and does not include scheduling information for the one or more downlink signals or the one or more uplink signals.

19. The method of claim 12, wherein the TCI state is indicated in one or more reserved bits or one or more fields of the DCI.

20. The method of claim 12, wherein the DCI includes an identifier associated with the TCI state and one or more of a serving cell identifier or a bandwidth part identifier associated with the TCI state.

21. The method of claim 12, wherein the TCI state indicated in the DCI is associated with a quasi co-location (QCL) source reference signal per QCL type.

22. The method of claim 21, wherein the QCL source reference signal includes a synchronization signal block, a channel state information reference signal, or a sounding reference signal.

23. A user equipment (UE) for wireless communication, comprising:
one or more memories; and
one or more processors coupled to the one or more memories, the one or more processors individually or collectively configured to:
receive, from a base station, downlink control information (DCI) that indicates a transmission configuration indication (TCI) state associated with a common beam for joint downlink and uplink communication,
wherein the DCI includes resource identifiers associated with one or more downlink signals or one or more uplink signals that are communicated using the common beam associated with the TCI state, wherein the resource identifiers include:
a control resource set identifier (CORESET) and a physical uplink control channel (PUCCH) resource identifier based at least in part on the TCI state being applicable to communications associated with downlink and uplink control channels,
a physical downlink shared channel (PDSCH) resource identifier and a physical uplink shared channel (PUSCH) resource identifier based at least in part on the TCI state being applicable to communications associated with downlink and uplink data channels,
a channel state information reference signal (CSI-RS) resource identifier and a sounding reference signal (SRS) resource identifier based at least in part on the TCI state being applicable to communications associated with downlink and uplink reference signals,
a CORESET identifier, a PUCCH resource identifier, a PDSCH resource identifier, and a PUSCH resource identifier based at least in part on the TCI state being applicable to communications associated with downlink and uplink control and data channels,
a CORESET identifier and a PDSCH resource identifier based at least in part on the TCI state being applicable to communications associated with downlink control and data channels, or
a PUCCH resource identifier and a PUSCH resource identifier based at least in part on the TCI state being applicable to communications associated with uplink control and data channels; and
communicate with the base station on one or more of a downlink or an uplink using the common beam associated with the TCI state indicated in the DCI.

24. The UE of claim 23, wherein the DCI is associated with a DCI format that is associated with indicating the TCI state and includes scheduling information for the one or more downlink signals or the one or more uplink signals.

25. A base station for wireless communication, comprising:
one or more memories; and
one or more processors coupled to the one or more memories, the one or more processors individually or collectively configured to:
transmit, to a user equipment (UE), downlink control information (DCI) that indicates a transmission configuration indication (TCI) state associated with a common beam for joint downlink and uplink communication,
wherein the DCI includes resource identifiers associated with one or more downlink signals or one or more uplink signals that are communicated using the common beam associated with the TCI state, wherein the resource identifiers include:
a control resource set identifier (CORESET) and a physical uplink control channel (PUCCH) resource identifier based at least in part on the TCI state being applicable to communications associated with downlink and uplink control channels,
a physical downlink shared channel (PDSCH) resource identifier and a physical uplink shared channel (PUSCH) resource identifier based at least in part on the TCI state being applicable to communications associated with downlink and uplink data channels,
a channel state information reference signal (CSI-RS) resource identifier and a sounding reference signal (SRS) resource identifier based at least in part on the TCI state being applicable to communications associated with downlink and uplink reference signals,
a CORESET identifier, a PUCCH resource identifier, a PDSCH resource identifier, and a PUSCH resource identifier based at least in part on the TCI state being applicable to communications associated with downlink and uplink control and data channels,
a CORESET identifier and a PDSCH resource identifier based at least in part on the TCI state being applicable to communications associated with downlink control and data channels, or a PUCCH resource identifier and a PUSCH resource identifier based at least in part on the TCI state being applicable to communications associated with uplink control and data channels; and communicate with the UE on one or more of a downlink or an uplink using the common beam associated with the TCI state indicated in the DCI.

26. The base station of claim 25, wherein the DCI is associated with a DCI format that is associated with indicating the TCI state and includes scheduling information for the one or more downlink signals or the one or more uplink signals.

27. The UE of claim 23, wherein the DCI is associated with a DCI format that is associated with indicating the TCI state and does not include scheduling information for the one or more downlink signals or the one or more uplink signals.

28. The UE of claim 23, wherein the TCI state is indicated in one or more reserved bits or one or more fields of the DCI.

* * * * *